3,135,807
MANUFACTURE OF METHYL t-BUTYL ETHER
Robert Grasselli and Theodore B. Selover, Jr., Cleveland, and James L. Callahan, Bedford, Ohio, assignors to The Standard Oil Company, Cleveland, Ohio, a corporation of Ohio
No Drawing. Filed Dec. 30, 1960, Ser. No. 79,554
1 Claim. (Cl. 260—614)

The present invention relates to a process for the manufacture of methyl t-butyl ether. More particularly, the process of this invention involves a catalytic reaction of isobutylene and methanol resulting in the formation of methyl t-butyl ether.

Methyl t-butyl ether is particularly useful as an ingredient of an internal combustion engine motor fuel as it has a very high blending octane number. For example, a blend comprising 20% methyl t-butyl ether and 80% of a standard 60 octane reference fuel has an F-1 (clear) octane number of 77.3 which shows that the methyl t-butyl ether has a blending octane number of 147 in this blend.

The catalytic conversion of isobutylene and methanol to methyl t-butyl ether is a well-known reaction and the prior art offers a number of suggestions as to how this conversion might be accomplished. For example, it has been known since 1907 [Bull. Soc. Chem. Blg., 21, 71 (1907)] that sulfuric acid is an effective catalyst in this reaction. However, all of the prior art processes which employ sulfuric acid as the catalyst are beset by the same problem, i.e., the difficulties involved in separating sulfuric acid from the reaction mixture so that it may be reused.

In brief, the process of the present invention comprises the step of reacting isobutylene with methanol at an elevated temperature and pressure in the presence of a catalyst. The process of this invention may be carried out in either the liquid or vapor phase, but the vapor phase operation is preferred. In one embodiment of the invention a small amount of water may be introduced with the reactants since it is believed that water has a beneficial effect on the reaction.

The catalyst which is employed in the process of this invention is selected from the group consisting of bismuth molybdate and the lead, antimony, tin, iron, cerium, bismuth, nickel, cobalt and thorium salts of phosphomolybdic acid. These catalytic materials may be used alone or they may be supported on carrier materials, e.g., zinc spinel, alumina, silica, magnesia, titania, silica-alumina, alumina-magnesia, pumice, kieselguhr, bentonite clays, bauxite, charcoal, etc. If a support is employed the final catalyst composition should contain at least 5% of the active catalytic ingredient.

The above-mentioned catalysts have been found to give not only good conversion of isobutylene to the methyl t-butyl ether, but also, and this is one of the more surprising aspects of the invention, the catalysts exhibit unusually high selectivity for methyl t-butyl ether. As a matter of fact, all of the named catalysts will give conversions of isobutylene to methyl t-butyl ether of at least 40 mole percent per pass at selectivities above 90%. There is nothing critical about the method of preparation of these catalysts, and they may be prepared by any method known to those skilled in the art. Likewise, the catalyst compositions may be subjected to heat treatment prior to use in order to alter their properties, but such treatment is conventional and forms no part of the present invention.

While it is possible to carry out the process of this invention in a batch manner, the preferred mode of operation is in a continuous manner. The catalyst may be disposed in the reactor in either a fixed bed or in a so-called "fluidized" bed. The product of this process may be recovered by conventional means such as distillation and unreacted feed material may be recovered and recycled to the reactor if desired, but these steps form no part of the present invention.

The process is carried out under relatively mild operating conditions. It has been discovered that excellent results are obtained within the temperature range of 100 to 400° F. at pressures in the range of 25 to 1000 p.s.i.g. In the usual case, methanol should be present in at least the stoichiometric ratio with respect to isobutylene, and mole ratios of methanol to isobutylene above 1:1 are preferred since an excess of methanol favors the formation of ether. The space velocity of the reaction mixture within the reactor is not believed to be particularly critical and velocities of 0.1 to 5 v.v.h. give very good results. If water is added to the reaction mixture the amount present should not exceed 0.05 mole per mole of isobutylene as amounts in excess of this figure will tend to favor the formation of the corresponding alcohol rather than ether. It is to be understood, however, that it is not essential that water be added to the reaction mixture, as good results can be obtained in the absence of water.

One of the important advantages of the process of this invention resides in the fact that the process does not produce the deleterious by-products which are characteristic of the processes of the prior art. The only by-product which apears in any significant amount is diisobutylene, but this occurs only in amounts which are so small as to have no effect on the overall economics of the process.

The invention will be better understood in the light of the illustrative examples which now follow.

EXAMPLE A

A lead phosphomolybdate catalyst was prepared in the following manner. 331 g. of $Pb(NO_3)_2$ were dissolved in 300 cc. of boiling water while 170 g. of molybdic acid (85% $MoO_3$) were dissolved in 150 cc. of water. These solutions were then added to 1330 g. of a low alkali silica sol containing 30% by weight silica which also contained 5.8 cc. 85% $H_3PO_4$ and 5 cc. of concentrated nitric acid. After vigorous mixing the solution was dried, ground, screened and finally pelleted.

EXAMPLE B

An antimony phosphomolybdate catalyst was prepared in the following manner. 218 g. of $Sb_2O_3$ and 400 g. of d-tartaric acid were dissolved in 350 cc. of boiling water. 170 g. of molybdic acid (85% $MoO_3$) were dissolved in 150 cc. of water and 1330 g. of an aqueous silica sol containing 30% by weight silica was mixed with 5.8 cc. of 85% phosphoric acid. These solutions were then mixed with vigorous stirring. The resulting solution was dried, ground, screened and finally pelleted.

EXAMPLE C

A tin phosphomolybdate catalyst was prepared in the following manner. 25 g. of SnCl₂ was dissolved in 200 cc. of water and sufficient ammonium hydroxide was added to this solution to bring the pH to 7. The resulting precipitate was filtered and washed. In another vessel, 170 g. of molybdic acid (85% MoO₃) were dissolved in 150 cc. of water. At the same time 1330 g. of an aqueous silica sol containing 30% by weight silica was mixed with 5.8 cc. of an 85% solution of phosphoric acid. This solution was then mixed with the molybdic acid solution. The previously prepared tin precipitate was then slurried into this mixture with 100 cc. of water. The resultant gel was heated to dryness. The dry cake was ground and screened and finally pelleted.

EXAMPLE D

An iron phosphomolybdate catalyst was prepared in the following manner. 303 g. of Fe(NO₃)₃·9H₂O was dissolved in 150 cc. of water. In another vessel 107 g. of molybdic acid (85% MoO₃) was dissolved in 150 cc. of hot water. Next 1330 g. of an aqueous silica sol containing 30% by weight silica was mixed with 5.8 cc. of an 85% solution of phosphoric acid. These three solutions were then mixed with stirring. The resulting solution was dried, ground, screened and finally pelleted.

EXAMPLE E

A cerium phosphomolybdate catalyst was prepared in the following manner. 4.6 cc. of phosphoric acid was added to 1330 g. of an aqueous silica sol containing 30% by weight silica. 170 g. of molybdic acid (85% MoO₃) were then added to the silica solution with mixing. An aqueous solution of cerium nitrate containing 315 g. of Ce(NO₃)₃·6H₂O was then added to the solution. This mixture was heated to dryness, ground, screened and finally pelleted.

EXAMPLE F

A bismuth molybdate catalyst was prepared in the following manner. 177 g. of (NH₄)₆Mo₇O₂₄·4H₂O were dissolved in 200 cc. of hot water. This solution was then added to 1083 g. of an aqueous silica sol containing 30% by weight of silica. A solution containing 364 g. Bi(NO₃)₃·5H₂O, 10 cc. of concentrated nitric acid and 200 ml. of water was then added to the silica solution. The resulting solution was heated to dryness, ground, screened and finally pelleted.

EXAMPLE G

A nickel phosphomolybdate catalyst was prepared in the following manner. 28 cc. of an 85% solution of phosphoric acid was added to 1330 g. of an aqueous silica sol containing 30% by weight silica. Next, 170 g. of molybdic acid (85% MoO₃) were added to this mixture, and finally, 448 g. of Ni(NO₃)₂·6H₂O, diluted with 400 cc. of water, was added to this solution. The solution was then heated to dryness, ground, screened and pelleted.

EXAMPLE H

A cobalt phosphomolybdate catalyst was prepared in the following manner. 218 g. of Co(NO₃)₂·6H₂O were dissolved in 150 cc. of water. 170 g. of molybdic acid (85% MoO₃) were dissolved in 150 cc. of hot water, while in another vessel 5.8 cc. of an 85% solution of phosphoric acid was added to 1330 g. of an aqueous silica sol containing 30% by weight of silica. These solutions were then mixed with stirring. The resulting solution was heated to dryness, ground, screened and finally pelleted.

EXAMPLE I

A bismuth phosphomolybdate catalyst was prepared in the following manner. 5.7 cc. of an 85% solution of phosphoric acid was mixed with 1083 g. of an aqueous silica sol containing 30% by weight of silica. A solution containing 170 g. of molybdic acid (85% MoO₃) in 200 cc. of water was then mixed with the silica solution. 364 g. of Bi(NO₃)₃·5H₂O was dissolved in a hot solution containing 20 cc. of concentrated nitric acid and 220 cc. of water. This solution was then added to the silica solution. The resulting solution was heated to dryness, ground, screened and finally pelleted.

EXAMPLE J

A thorium phosphomolybdate catalyst was prepared in the following manner. 28 cc. of an 85% solution of phosphoric acid was added to 1330 g. of an aqueous silica sol containing 30% by weight of silica. 170 g. of molybdic acid (85% MoO₃) were then added to the silica solution with mixing. Next, 442 g. of Th(NO₃)₄·4H₂O, dissolved in water, was added to the solution. The mixture was heated to dryness, ground, screened and finally pelleted.

Each of the catalysts named in the foregoing examples was tried experimentally. The experiments were all conducted in a reactor which was a stainless steel tube, having an internal diameter of 1.06 inches. This tube was disposed in an electric furnace and the temperature was maintained at 230° F. in all of the runs. The pressure was 210 p.s.i.g. and the space velocity was 1 v.v.h., and these variables were also maintained constant in all of the experiments. In each run the reactor contained approximately 100 cc. of catalyst in order to eliminate the amount of catalyst as a variable in the experiments. The products of the reactions were analyzed by means of gas chromatography. The feed was the same in all of the experiments, and it consisted of an equimolar mixture of isobutylene and methanol.

The results of these experiments are reported in the table which appears on the following page. In this table, selectivity is reported as the number of mols of methyl t-butyl ether produced by the reaction, divided by the number of mols of isobutylene fed to the reactor.

The table now follows:

Table

| Example | Catalyst Composition (Wt. Percent) | Per Pass Conversion of isobutylene to methyl t-butyl ether (Mol Percent) | Selectivity (Percent) |
| --- | --- | --- | --- |
| A | 48.3% Pb₁₂PMo₁₂O₅₀–51.7% SiO₂ | 54.7 | 96.5 |
| B | 39% Sb₉PMo₁₂O₃₂–61% SiO₂ | 52.9 | 98.9 |
| C | 36% Sn₆PMo₁₂O₅₀.₅–64% SiO₂ | 52.5 | 94.8 |
| D | 34.5% Fe₃PMo₁₂O₅₂–65.5% SiO₂ | 52.0 | 96.9 |
| E | 33.1% Ce(MoO₄)–2.6% CePO₄–64.4% SiO₂ | 51.6 | 99.5 |
| F | 50% Bi₃Mo₁₂O₄₉.₅–50% SiO₂ | 49.6 | 99.0 |
| G | 31.6% NiMoO₄–10.6% Ni₃(PO₄)₂–57.8% SiO₂ | 49.0 | 97.5 |
| H | 34.5% Co₃PMo₁₂O₅₂–65.5% SiO₂ | 48.9 | 96.8 |
| I | 50% Bi₃PMo₁₂O₅₂–50% SiO₂ | 48.6 | 98.2 |
| J | 35.2% Th(MoO₄)₂–13.7% Th₃(PO₄)₄–51.1% SiO₂ | 48.5 | 99.8 |

It will be readily apparent from the results reported in the preceding table that the process of this invention will produce t-butyl ether from isobutylene at very satisfactory conversion levels, i.e., above 45% conversion per pass. The data on selectivity is even more significant as it will be apparent that the amount of by-products produced by the process of this invention is so small as to be almost insignificant. Furthermore, the virtual absence of by-products makes it possible to recover pure methyl t-butyl ether with comparative ease by conventional means such as distillation. Furthermore, in those instances where the recycle of unreacted isobutylene is desired, the relative simplicity of the reaction effluent facilitates the recovery of isobutylene for this purpose.

It will be obvious to those skilled in the art that many modifications of the process described herein may be made without departing from the spirit or scope of this invention and we desire this application for Letters Patent to cover all such modifications as would reasonably fall within the scope of the appended claim.

We claim:

A process for the manufacture of methyl t-butyl ether comprising the step of contacting a mixture comprising methanol and isobutylene with a catalyst selected from the group consisting of bismuth molybdate and the lead, antimony, tin, iron, cerium, nickel, cobalt, bismuth and thorium salts of phosphomolybdic acid at a temperature in the range of 150 to 300° F. and at a pressure in the range of 100 to 1000 p.s.i.g., said mixture having a mole ratio of methanol to isobutylene of at least 1 to 1.

References Cited in the file of this patent

UNITED STATES PATENTS

| | | |
|---|---|---|
| 2,010,356 | Evans et al. | Aug. 6, 1935 |
| 2,080,034 | Evans et al. | May 11, 1937 |
| 2,139,359 | Evans et al. | Dec. 6, 1938 |
| 2,591,493 | Arnold et al. | Apr. 1, 1952 |

OTHER REFERENCES

Evans et al.: Industrial and Eng. Chem., vol. 28, 1936, pages 1186–1188.

UNITED STATES PATENT OFFICE
CERTIFICATE OF CORRECTION

Patent No. 3,135,807           June 2, 1964

Robert Grasselli et al.

It is hereby certified that error appears in the above numbered patent requiring correction and that the said Letters Patent should read as corrected below.

Column 4, in the table, under the heading "Catalyst Composition (Wt. Percent)" line 5 thereof, for "33.1% Ce(MoO$_4$)$_-$ -" read -- 33.1% Ce(MoO$_4$)$_3$- --.

Signed and sealed this 1st day of December 1964.

(SEAL)
Attest:

ERNEST W. SWIDER
Attesting Officer

EDWARD J. BRENNER
Commissioner of Patents